United States Patent [19]

Furneaux et al.

[11] Patent Number: 4,859,288

[45] Date of Patent: Aug. 22, 1989

[54] POROUS ANODIC ALUMINUM OXIDE FILMS

[75] Inventors: Robin C. Furneaux, Shenington; William R. Rigby, Banbury, both of England

[73] Assignee: Alcan International Limited, Montreal, Canada

[21] Appl. No.: 273,113

[22] Filed: Nov. 16, 1988

Related U.S. Application Data

[63] Continuation of Ser. No. 7,287, Jan. 27, 1987, abandoned.

[30] Foreign Application Priority Data

Feb. 3, 1986 [GB] United Kingdom ................ 8602582

[51] Int. Cl.$^4$ ............................................. C25D 11/00
[52] U.S. Cl. ........................................ 204/11; 204/58
[58] Field of Search .................................. 204/11, 58

[56] References Cited

U.S. PATENT DOCUMENTS 4,687,551 8/1987 Furneaux .............................. 204/11

OTHER PUBLICATIONS

Plating, vol. 58, pp. 449–457, (1971).
Trans. Inst. Metal Finishing, vol. 53, pp. 97–102, (1975).

Primary Examiner—T. M. Tufariello
Attorney, Agent, or Firm—Cooper & Dunham

[57] ABSTRACT

The invention provides porous anodic aluminium oxide film having a major face with an area of at least 50 cm$^2$, the film material containing phosphorus derived from the anodizing electrolyte, preferably at least 5 microns thick and preferably having pores spaced 0.1–0.5 microns apart. The film may be made by anodizing one or more aluminium metal anodes of suitable area in an electrolyte based on phosphoric acid at a concentration of 5–150 g/l maintained at a temperature in the range 5°–50° C. using an anodizing voltage of 40–200 V. After separation from the metal substrate, the films have intersecting properties for use in filters.

18 Claims, No Drawings

POROUS ANODIC ALUMINUM OXIDE FILMS

This is a continuation of application Ser. No. 07/007,287, filed Jan. 27, 1987, now abandoned.

This invention relates to porous anodic aluminium oxide films of substantial area and thickness, and to methods of making such films by anodizing aluminium metal substrates in phosphoric acid-based electrolyte. The invention includes the films when attached to a metal substrate, but is particularly concerned with the films after separation from the metal substrate on which they were formed.

Our European Patent Specification No. 178831 describes porous anodic aluminium oxide films having a particular structure, and methods of separating such films from aluminium metal substrates by a voltage reduction technique. Such films, together with other anodic oxide films of different structure, are useful as filters. For this purpose, it is important that the pores extending through the films should not be reduced or closed in use, for example as a result of swelling of the anodic oxide material.

When an aluminium metal substrate is anodized in an electrolyte, the resulting anodic oxide film contains a significant proportion of anions derived from the electrolyte. For example, when the electrolyte is based on phosphoric acid, the film may typically contain 2 to 3% by weight of combined phosphorus. It is well known that the presence of combined phosphorus in the film inhibits hydration and swelling of the anodic oxide. Hence, where films are to be used, e.g. as filters, in circumstances where pore size is important, there is a strong preference to form them by anodizing in phosphoric acid.

Phosphoric acid anodizing is widely practiced on a commercial scale. For example, G.B. No.1532112 describes a continuous phosphoric acid anodizing process to provide a base for subsequently applied adhesive. Large areas of aluminium are phosphoric acid anodized to provide plates for lithography. But in these cases, the anodic oxide films produced are thin, always less than about 3 microns and often well below 1 micron, and made by anodizing at low voltage.

Thicker phosphoric acid anodized films have been made, but only on a laboratory scale. R.C.Spooner (Plating, 1971, 58, pages 449 to 457) made films up to 7 microns thick, but reported that "the maximum film thickness for phosphoric acid films is less than the normal minimum thickness of interest . . . ". G. E. Thompson et al (Transactions of the Institute of Metal Finishing, 1975, 53, pages 97 to 102) made films 25 microns thick on 3 $cm^2$ electrodes.

High voltage anodizing of aluminium is carried out on a large scale in the production of hard anodic films having good wear resistance. This is carried out in 10 to 20% sulphuric acid at temperatures around 0° C. to give rise to films having a minimum hardness of 400 to 500 VPN associated with good wear and abrasion resistance. Good control of operating conditions, including electrolyte temperature, are required for this purpose, but the control problems have been solved for production on a commercial scale.

Phosphoric acid anodizing gives rise to soft anodic films having low wear resistance. This arises because alumina is much more soluble in phosphoric acid than in sulphuric acid, so that anodic oxide film formation in phosphoric acid is always accompanied to a significant extent by film dissolution. The production of thick phosphoric acid anodized films of substantial area requires much more careful control of anodizing conditions than does corresponding sulphuric acid anodizing. Hitherto, thick phosphoric acid anodized films have never been of more than laboratory interest. As a result of our (unpublished) work on the use of such films as filters, there is now a need to make such films on a substantial scale. It is an object of this invention to fulfil that need.

In one aspect, the invention provides a porous anodic aluminium oxide film having a major face with an area of at least 50 $cm^2$ and a thickness of at least 5 microns, the film material containing phosphorus derived from the anodizing electrolyte.

In another aspect, the invention provides a porous anodic aluminium oxide film having a major face with an area of at least 50 $cm^2$, the pores being spaced from 0.15 to 0.5 microns apart on the face and the film material containing phosphorus derived from the anodizing electrolyte. Usually the film is at least 1 micron, preferably at least 3 microns, thick.

In yet another aspect the invention provides a method of making porous anodic aluminium oxide films which method comprises providing a cell containing an electrolyte based on phosphoric acid at a concentration of 5–150 g/l, at least one aluminium metal anode, the anode or anodes having an effective anodic surface area of at least 100 $cm^2$ and a thickness of at least 0.5 mm, and a cathode, passing a current through the cell at a voltage of 40–200 V and maintaining the electrolyte temperature at a chosen value in the range 5°–50° C.

The porous anodic aluminium oxide film may be used for some purposes still attached to the aluminium metal substrate on which it was formed. However, for many applications including filtration it is not attached to any substrate, in which case each major face has an area of at least 50 $cm^2$ and preferably of at least 100 $cm^2$. The film is generally from 5 to 100 and preferably from 10 to 60, microns thick. Such films are self-supporting and capable of withstanding a fair amount of mechanical damage while still having interesting filter properties. The film contains a minor proportion of combined phosphorus derived from the anodizing electrolyte, effective to reduce or eliminate changes in pore size that might otherwise result from hydration and swelling of alumina; this proportion typically lies in the range of 1–5 atomic % determined from phosphate ion concentration measured calorimetrically.

The method of forming these films involves anodizing with careful control of a considerable number of variables, as will now be discussed. The anodizing electrolyte contains from 5 to 150 g/l, preferably from 20 to 70 g/l, of phosphoric acid. Use of higher concentrations results in such rapid dissolution of alumina that it is difficult to form thick forms. Use of lower concentrations results in uneven, uncontrollable and slow rates of film formation. The electrolyte may contain other solutes known to give rise to porous anodic oxide films, such as for example oxalic acid, or other compounds which reduce dissolution, and these additions may be beneficial to reduce chemical dissolution and permit the formation of thicker films.

Three major variables are electrolyte temperature, voltage and current density. The electrolyte temperature is preferably set at a value in the range of 10° to 40° C., preferably from 15° to 35° C. Above the top end of this range, dissolution of the anodic film is likely to be inconveniently rapid. Below 10° C., burning and low film growth rates are likely to be problems.

The voltage is preferably from 40 to 200 V. Anodizing below 40 V gives low film growth rate. Anodizing above 200 V is likely to be impossible due to dielectric breakdown. The voltage is preferably at least 60 V.

The current density is preferably from 25 to 1000 A/m$^2$ of anode area. Current densities of 50 to 250 A/m$^2$ are generally chosen, due to the difficulty of dissipiating heat produced at higher densities. Current density is a consequence of voltage and electrolyte concentration and temperature.

The current may be straight DC. Alternatively, various forms of biased, interrupted or pulsed current may be used, and may be advantageous in achieving faster and more even film growth with reduced risk of burning. In order to avoid burning, it is necessary to raise the voltage or the current density slowly to the desired anodizing value. For example, the maximum current density may be set initially, and the voltage raised from zero at a rate of 0.02 to 0.5 V/s to the desired value.

Anodizing is continued for a time to achieve the desired film thickness. Times in the range of 5 minutes to 240 minutes are likely to be sufficient for this method. Film growth rate is approximately linearly related to current density; for example, at 150 A/m$^2$ may imply a film growth rate of 0.5 microns per minute.

Electrolyte temperature has a major effect on the system, and is preferably held constant within 1° C. or even less of the chosen value. This is not easy in a cell of commercial size, in view of the large amount of heat that is produced, and is preferably achieved by a combination of vigorous agitation and electrolyte recirculation. Stirring is liable to produce nonuniform film growth. Air agitation by tubes with holes bored in them is also not appropriate. It has been found that porous ceramic pots are a suitable source of air because the fine stream of bubbles can cause adequate electrolyte movement without blanking off areas of anode surface.

Cooling of electrolyte is preferably effected by circulating the electrolyte between the cell and one on more external heat exchangers. The extent of recirculation and cooling can readily be adjusted to remove the required amount of heat.

A problem frequently encountered in high voltage anodizing and referred to above is that of burning. At high current density any point weakness on the anode, in the form of low electrical resistance, may give passage to a high proportion of the available current and within seconds this point of low resistance will be subject to enormous current densities and the resultant high temperature will encourage the oxidation of the metal substrate. Burning may result in a region of thicker film or film of reduced thickness. In extreme cases the metal may be locally dissolved away. Among variables which may give rise to burning are low electrolyte concentration, low electrolyte temperature, the use of straight DC, and inadequate agitation. Attention to these variables should therefore help to minimize burning.

Another variable which appears to have some connection with burning is the aluminium ion concentration in the electrolyte, and this should preferably be in the range 0 to 6 g/l. It is therefore useful to monitor aluminium ion concentration, which is readily done by observing its atomic absorption spectrum, and to take action when the concentration gets too high.

This invention is concerned with the commercial production of anodic oxide films on a substantial scale. We therefore specify that the anode has an effective anodic surface area of at least 100 cm$^2$, preferably at least 1000 cm$^2$. When a thin anode is sandwiched between two cathodes, both surfaces of the anode are counted in determining effective anodic surface area. The anode may be unitary, or may be divided into several separate pieces, the area of each piece being not important although it would generally be inconvenient to use small pieces below 100 cm$^2$ effective surface area. Although this is not preferred, a single cell may be divided by partitions into several regions each provided with an anode, and each region may have separate means for agitation and recirculation of electrolyte. Alternatively, it is possible to contemplate a unitary cell with a continuous anode in which a point on the anode has a residence time in the cell sufficient to coat it with an anodic oxide film of desired thickness.

The anode is at least 0.5 mm or 1 mm, and preferably at least 1.5 mm, thick. The heat carrying capacity of such thick anodes helps to avoid burning.

Sharp edges or deep scratches on the anode can act as sites to initiate burning. However, bright rolled metal has been found perfectly adequate to avoid such problems. Care is also required with jigging, since capillary action between anode and jig can also initiate burning. To avoid initiation of burning by inclusions or alloying constituents, it is preferred to use aluminium metal of at least 99.5% purity. Commercial purity aluminium is suitable.

The nature of the cathodes is not critical. Generally conventional carbon cathodes will be used. To avoid the risk of edge effects, which again could lead to burning, the anode preferably extends in all directions beyond the perimeter of the cathode.

In the resulting anodic oxide films, the pores are generally spaced apart approximately 2.5 nm per volt, and have a diameter of at least about 1 nm per volt. In the film of this invention, the pores are preferably spaced from 0.1 to 0.15 to 0.5 microns apart, and preferably have a size (diameter) of at least 0.04 microns. Phosphoric acid anodizing always involves simultaneous film growth (at the metal/oxide interface), and film dissolution (at the oxide/electrolyte interface). This dissolution is concentrated round the pores and results in enlargement of the pores at their outer ends. In the limiting case, dissolution proceeds as fast as oxidation of metal, and film thickness remains constant on continued anodizing.

Having formed the anodized film, it is possible simply to dissolve away the remaining aluminium metal substrate, and recover a film with generally cylindrical pores extending straight through. A preferable technique involves separating the anodic oxide film from the substrate without destroying the substrate. This may be done by immersing the substrate with an adherent anodic oxide film in an electrolyte, anodizing it under a progressively reduced voltage until film detachment occurs, and removing the oxide film from the substrate. The electrolyte may be the same electrolyte as used for anodizing or a different one based on phosphoric acid or on some other electrolyte known to be capable of giving rise to porous anodic films. As mentioned above, a particular voltage reduction technique is described in EPA 178831. This results in a film with a system of larger pores extending in from one face and interconnecting with a system of smaller pores extending in from the other face. In this case, the "major face" referred to herein is that with the system of larger pores.

The following example illustrates the invention.

EXAMPLE

A cell was set up containing 1067 l of 40 g/l $H_3PO_4$ as electrolyte. The anode was 99.99% aluminium sheet 1.5 mm thick, pretreated by mechanical polishing followed by electrobrightening, 14 sheets each $500 \times 150$ mm having an effective anodic surface area of $2m^2$. The anode was positioned between conventional carbon cathodes, such that the effective cathodic surface area to effective anodic surface area ratio was 0.66. The voltage limit was set at 160 V and the current density limit at $150 A/m^2$. The current was increased from zero to full value over twenty minutes. Electrolyte agitation was effected by fine streams of bubbles from ceramic pots positioned below the interelectrode spaces. The electrolyte temperature was maintained at 25° C. by recirculation of electrolyte between the cell and and an external heat exchanger. After sixty minutes of anodizing at the full current a film thickness of $30 \pm 2$ microns was achieved with a steady state anodizing voltage of about 140 V, equivalent to a pore spacing of 0.35 microns.

The film was separated from the substrate by a procedure involving a controlled voltage reduction from the final anodizing voltage to 0.3 V in the same electrolyte as anodizing, followed by chemical dissolution, rinsing and drying. A computer was used to control the power supply to effect voltage decrements of the greater of 0.3 V or 5% of the existing voltage. After each decrement, a monitoring system detected the maximum positive value of rate of change of current and caused the subsequent decrement when the rate of change of current fell to 50% of this maximum. On completion of this procedure the film was detached but not separated from the aluminium. Separation was brought about by immersion in 33% by volume $H_3PO_4$ at room temperature for 6 minutes followed by rinsing and drying.

We claim:

1. A porous anodic aluminium oxide film having a major face with an area of at least 50 $cm^2$ and a thickness of at least 5 microns, the film material containing phosphorus derived from the anodizing electrolyte, said film being separate from the metal substrate on which it was formed.

2. A film as claimed in claim 1, wherein the pores are spaced from 0.1 to 0.5 microns apart on the face.

3. A porous anodic aluminium oxide film having a major face with an area of at least 50 $cm^2$, the pores being spaced from 0.15 to 0.5 microns apart on the face and the film material containing phosphorus derived from the anodizing electrolyte.

4. A film as claimed in claim 3, having a thickness of at least 5 microns.

5. A film as claimed in claim 1, having a thickness of at least 10 microns.

6. A film as claimed in claim 1, wherein the film material contains 1-5 atomic % of phosphorus.

7. A film as claimed in claim 1, wherein the pores have a size of at least 0.04 microns on the face.

8. A method of making porous anodic aluminium oxide films which method comprises providing a cell containing an electrolyte based on phosphoric acid at a concentration of 5-150g/l, at least one aluminium metal anode, the anode or anodes having an effective anodic surface area of at least 100 $cm^2$ and a thickness of at least 0.5 mm, and a cathode, raising the voltage slowly to a desired anodizing value, passing a current through the cell at a voltage of 40-200 V and maintaining the electrolyte temperature at a chosen value in the range 5°-50° C. until the anodic oxide film is at least 10 microns thick.

9. A method as claimed in claim 8, wherein the electrolyte temperature is maintained by recirculation of the electrolyte between the cell and an external heat exchanger.

10. A method as claimed in claim 8, wherein the current density is from 50 to 250 $A/m^2$ of anodic surface area.

11. A method as claimed in claim 8, wherein the aluminium ion content of the electrolyte is from 0 to 6 g/l.

12. A method as claimed in claim 8, wherein the effective anodic surface area is at least 1000 $cm^2$.

13. A method as claimed in claim 8, wherein the anode is of aluminium metal of at least 99.5% purity.

14. A method as claimed in claim 8, wherein there is used a single aluminium metal anode having an effective anodic surface area of at least 100 $cm^2$.

15. A method as claimed in claim 8, wherein the anode has a thickness of at least 1mm.

16. A method as claimed in claim 8, wherein the step of raising the voltage slowly is performed by raising the voltage at a rate of 0.02 to 0.5 volts per second.

17. A filter comprising a porous anodic aluminium oxide film having a major face with an area of at least 50 $cm^2$ and a thickness of at least 5 microns, the film material containing phosphorus derived from the anodizing electrolyte.

18. A filter comprising a porous anodic aluminium oxide film having a major face with an area of at least 50 $cm^2$, the pores being spaced from 0.15 to 0.5 microns apart on the face and the film material containing phosphorus derived from the anodizing electrolyte.

* * * * *